L. DENIS.
SAWING MACHINE.
APPLICATION FILED MAY 27, 1919.

1,346,446.

Patented July 13, 1920.

Inventor
L. Denis
By H. R. Kerslake
Atty.

UNITED STATES PATENT OFFICE.

LOUIS DENIS, OF LIEGE, BELGIUM.

SAWING-MACHINE.

1,346,446.   Specification of Letters Patent.   Patented July 13, 1920.

Application filed May 27, 1919. Serial No. 300,154.

*To all whom it may concern:*

Be it known that I, LOUIS DENIS, manufacturer, a subject of the King of Belgium, and resident of Liege, in the Kingdom of Belgium, have invented certain new and useful Improvements in Sawing-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to an automatic sawing machine operated by hand or power.

Sawing machines of the kind hitherto known suffer from the following disadvantages in particular:

1. The speed of penetration of the saw varies with the hardness of the material being sawed so that if the material is harder at any one part than at another, the speed of penetration of the saw is less at that part, and the time taken in the sawing operation is consequently longer.

2. On the other hand, when the material being sawed present different sections to be cut, even supposing that the hardness is uniform over the whole depth, the resistance offered to the saw will vary according to the section, and consequently the speed of penetration of the saw will likewise be subject to more or less considerable variations.

With the present invention a speed of penetration can be maintained during the whole time of the sawing operation, that is more nearly constant than with any of the contrivances hitherto known.

Further, in sawing machines hitherto used, when pieces of material differing from that on which the saw has just been operating, require to be sawed, the pressure on the saw must be adjusted or altered, to secure proper working, but with the present invention such adjustment is effected automatically.

Again, in the return movement of the saw, its friction against the article being sawed is reduced to a minimum, which means an economy of driving power and a diminution of wear of the saw blade.

Under this invention, the saw is made solid with one or more links or sleeves that slide on one or more rods inclined in the direction of the action of the saw so that the resistance the saw meets with in action is resolved into two forces, one at right angles to the direction of the said rods, and consequently producing no effect, and the other vertical, adding its effect to the weight bearing on the saw. In its return movement, the resistance experienced by the saw is exercised in the opposite direction and the load on the saw is therefore lessened instead of being increased.

The drawings attached to the present description illustrate, by way of example, one method of putting the invention into effect or practice.

Figure 1:
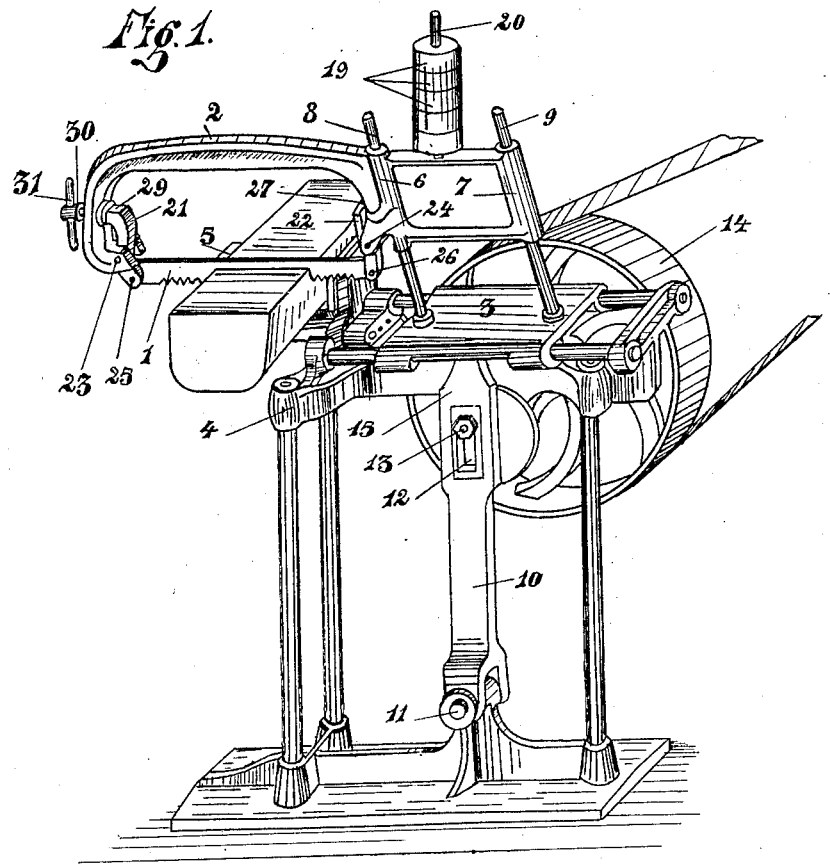
Figure 1 is a perspective view of the sawing machine, wherein the parts of secondary importance with respect to the invention, have been suppressed, particularly those for producing automatic stoppage of the machine.

The saw blade 1 is fixed to a frame 2, supported on a carriage 3 which makes an alternating rectilinear movement.

To allow of the saw 1 making an up and down movement, with respect to the bench 5 which supports the piece to be sawed and is fixed to the table 4, the saw frame 2 is made solid with two links or sleeves 6 and 7 which slide on the rods 8 and 9 that are connected to the carriage 3.

An alternating rectilinear movement is communicated to the carriage 3 by the extremity 15 of the lever 10, which is pivoted at 11 and is provided with a slot 12 in which moves a crank 13 forming part of the shaft actuated by the wheel 14.

Figure 2:
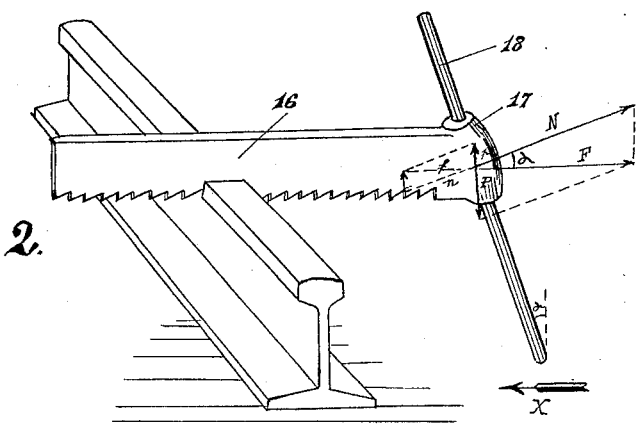
Fig. 2 shows the resolution of forces, on which this invention is particularly based.

In order to give to the saw blade 1 a penetrating force which will vary with the resistance encountered by the saw, the rods 8 and 9 are inclined in the direction of action of the saw, so as to make with the vertical an angle $\alpha$ (Fig. 2).

Under those conditions when the saw 16 (Fig. 2) advances in the direction of its action X, it meets with a resistance F, which is transmitted to the sleeve or link 17 and which is resolved into a force N, at right angles to the direction of the rod 18, and a force P, acting vertically downward.

The force N produces no effect, while the vertical force P is added to the load on the saw, constituted in the example shown in Fig. 1 by the weight of the frame 2, of the sleeves or links 6 and 7, and by the weight 19 on the rod 20.

It will be seen that P equals F. tan. α. Now as the angle α is constant, the force P which is added to the weight on the saw will increase at the same time as the resistance F met with by the saw. On the other hand, if $f$ represents the resistance that the saw encounters in its return movement, it will be observed that $f$ can be resolved into two forces $n$ and $p$, one of them at right angles to the direction of the rod 18, the other vertical and acting upward. The force $n$ exercises no effect, while the force $p$ serves to diminish proportionately the load on the saw. Just as in the other case, it will be seen that $p$ equals $f$. tan. α.

The saw blade 1, in Fig. 1, is attached to the frame 2 through pieces 21 and 22, pivoted at 23 and 24 and is held in tension between the extremities 25 and 26 of the pieces 21 and 22. One of the extremities 27 of the piece 22 buts against the lateral edge 28 of the frame, while the extremity 29 of the piece 21 buts against the end of the regulating screw 30, which can be operated by the handle 31. By turning the handle 31 greater or less tension can be put upon the saw blade 1.

If it is desired to saw pieces of a depth greater than the space between the saw blade 1 and the upper side of the saw frame 2, the pieces 21 and 22 can be replaced by other pieces of similar profile but of such a length that the distance between the saw blade 1 and the upper side of the frame 2 will be sufficient to allow of the desired work being done.

What I claim is:

A sawing machine having a saw blade frame slidably supported on rods, means to give said rods an alternating rectilinear movement, said rods being inclined at an angle to the direction of the cutting movement of the saw blade.

In testimony whereof I affix my signature in presence of two witnesses.

LOUIS DENIS.

Witnesses:
 LEONARD LERA,
 Y. DACO.